L. W. TURNER & G. J. CAPEWELL.
CULINARY FORK.
No. 174,646.          Patented March 14, 1876.
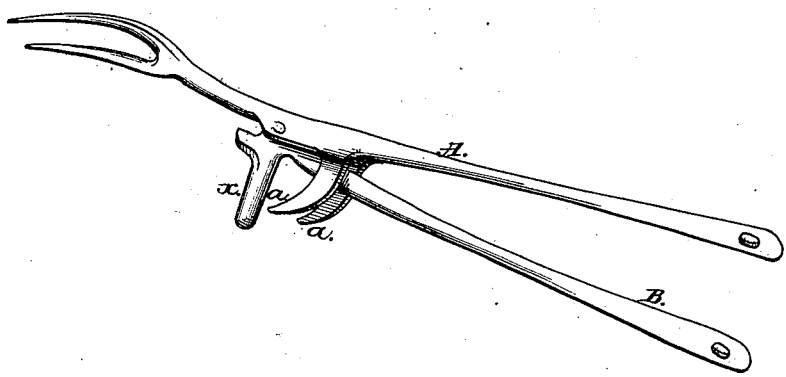
Attest:
Roger M. Shuman
William F. Hopson
Inventors:
Lewis W. Turner
George J. Capewell
by George Terry
Attorney

UNITED STATES PATENT OFFICE.

LEWIS W. TURNER, OF YALESVILLE, AND GEORGE J. CAPEWELL, OF CHESHIRE, CONNECTICUT.

IMPROVEMENT IN CULINARY FORKS.

Specification forming part of Letters Patent No. 174,646, dated March 11, 1876; application filed December 21, 1875.

*To all whom it may concern:*

Be it known that we, LEWIS W. TURNER, of Yalesville, in the town of Wallingford, in the county of New Haven and State of Connecticut, and GEORGE J. CAPEWELL, of Cheshire, in the county and State before mentioned, have invented a new and Improved Culinary Fork; and we do hereby declare the following to be a full, clear, and concise description of the invention, such as will enable others skilled in the art to which it pertains to make and use it, reference being had to the accompanying drawing, which forms a part of this specification.

Our invention consists in attaching to kitchen-fork a device for tipping kettles.

In the drawing, A is the fork, to which the tipping device is attached. It is made with the curved prongs or projections $a\ a$, and a slot is formed on the same side of the handle with the prongs, as shown in the drawing. B is an element forming a part of the tipping device, and consists of a handle corresponding in size with the handle of the fork, and of the piece $x$. It is pivoted to the fork A by a rivet passing through the portions of the handle forming the slot. Its end having the piece $x$ extends beyond the rivet, and is formed so as to prevent the handles from opening too wide.

The manner in which our improved fork is applied to kettles to tip them is as follows: A hole being made through the lid of the kettle near its edge, the piece $x$ is passed through it, and the handles being open, the edge of the kettle comes between the piece $x$ and the prongs $a\ a$, and is firmly held by them as the handles are grasped by the hand. The kettle being thus held, the tines of the fork extend onto the lid, and hold it on the kettle, while the handles of the fork and tipping device are turned to any degree required.

We claim as our invention—

1. The fork A, provided with the prongs $a\ a$, in combination with the element B, pivoted to the fork, substantially as shown and described.

2. In a device for tipping kettles, the element B, substantially as shown and set forth.

LEWIS W. TURNER.
GEORGE J. CAPEWELL.

Witnesses:
GEORGE TERRY,
ROGER M. SHERMAN.